Patented Dec. 14, 1937

2,101,910

UNITED STATES PATENT OFFICE 2,101,910

PROCESS FOR THE MANUFACTURE OF ALKOXYANTHRAQUINONES

Frank Lodge and Colin Henry Lumsden, Blackley, Manchester, England, assignors to Imperial Chemical Industries Limited, a corporation of Great Britain No Drawing. Application July 18, 1936, Serial No. 91,429. In Great Britain July 25, 1935

9 Claims. (Cl. 260—59)

According to this invention we make alkoxyanthraquinones, in which the alkoxy substituent contains a long-chain alkyl group with 10 to 20 carbon atoms by reacting an alkali metal compound of a monohydric alcohol with 10 to 20 carbon atoms with an anthraquinone compound substituted by an alkoxy group having 1 to 5 carbon atoms or by a β-hydroxyethoxy, glyceryloxy, phenoxy or cresoxy group.

It is known that certain anthraquinone dyestuffs containing long-chain alkyl groups are faster to washing and milling than the corresponding dyestuffs devoid of alkyl groups or containing only methyl groups (see for instance U. S. Patents 2,014,810 and 2,074,179, and British Patents 443,776 and 443,835). One form in which the long-chain alkyl groups may be present is in alkoxy-substituents as in U. S. Patent 2,014,810 and the only known anthraquinone compounds containing long-chain alkoxy groups are those described in that application, namely 1-amino-4-arylamino-2-alkoxyanthraquinones, which are intermediates for dyestuffs, and the corresponding sulfonic acids which are dyestuffs of very good fastness to washing and milling. The present invention provides an improved process for making the intermediates for the dyestuffs of U. S. Patent 2,014,810 and also a new process for making unknown alkoxyanthraquinones, (in which the alkoxy substituent contains a long-chain alkyl group with 10 to 20 carbon atoms), which are suitable intermediates from which to make other new dyestuffs similar to the valuable ones of U. S. Patent 2,014,810. The improvement in making the intermediates for the dyestuffs of U. S. Patent 2,014,810 lies in the higher yields obtained. British Patent 361,338 describes making anthraquinone compounds with alkoxy substituents by treating aryloxyanthraquinones with monohydric alcohols by a process similar to that of this invention, but it does not disclose the use of alcohols higher than butyl nor does it disclose the replacement of lower alkoxy groups by higher ones. In fact the only previously known way of making anthraquinone compounds containing long-chain alkyl groups other than that of U. S. Patent 2,014,810 were those of British Patents 393,966 and 394,343. Anthraquinone compounds with substituents containing such long-chain groups were first mentioned in British Patent 393,966 which describes condensing 1:5-diamino-4:8-dihydroxyanthraquinone-3:6-disulfonic acid with lauric acid chloride, the resulting product being formulated as 1-amino-5-lauroylamino-4:8-dihydroxyanthraquinone-3:6-disulfonic acid. British Patent 394,343, describes introducing long-chain alkyl groups into dyestuffs or intermediates for dyestuffs by interacting a suitable alkyl halide with a compound containing a hydroxyl or amino substituent or by interacting an alcohol or an amine containing such a radical with a group containing a reactive halogen atom. The process is carried out in the case of anthraquinone derivatives by reacting aminoanthraquinone with an alkyl halide. As compared with these previously known processes the process of this invention has the advantage of needing only the long-chain alcohols, which except perhaps for the free carboxylic acids are the most readily available of the long-chain compounds. Further the process of this invention takes place smoothly and the yields are good, being generally between 60 and 100%.

As monohydric alcohols for use in accordance with this invention any of the monohydric alcohols with 10 to 20 carbon atoms which contain a long-chain are suitable, and especially decyl, dodecyl, cetyl and octadecyl alcohols. The alkoxyl group containing 1-5 atoms may be derived from any of the monohydric alcohols with not more than 5 carbon atoms, e. g. it may be methoxy, ethoxy, propoxy, sec.-propoxy, butoxy, sec.-butoxy, tert.-butoxy, amyloxy or sec.-amyloxy. The cresoxy group may be derived from o-, m- or p-cresol.

The anthraquinone compounds which are used as starting materials in this invention may contain other substituents in addition to the alkoxy, β-hydroxyethoxy, glyceryloxy, phenoxy and cresoxy substituents, as for example methyl, halogen, nitro, amino, methylamino, anilino, arylamino and sulfo substituents. The α-alkoxyanthraquinones in which the alkoxy substituent contains a long-chain alkyl group with 10 to 20 carbon atoms are all new. When the anthraquinone compound used as starting material is a 1-amino-4-arylaminoanthraquinone, substituted in the 4-position, the arylamino substituent may be for instance anilino, o- or p-tolylamino, xylylamino, or alkoxyanilino.

In working according to our invention the alkali metal compounds of the alcohols may be provided by heating the alcohol with an alkali metal hydroxide or by using an alkali metal hydroxide in excess of the alcohol.

The following examples in which parts are by weight illustrate but do not limit the invention.

*Example 1.*—5 parts of 1-amino-4-anilino-2-phenoxyanthraquinone (made by the process of U. S. Patent 1,038,589 but using 1-amino-4-anilino-2-bromoanthraquinone instead of the corresponding p-tolylamino compound), 15 parts of dodecyl alcohol and 1 part of potassium hydroxide powder are stirred together at 120° C. for 6 hours. 50 parts of ethyl alcohol are added and on cooling 1-amino-4-anilino-2-dodecyloxyanthraquinone separates and is filtered off, washed successively with ethyl alcohol and water and dried. The compound is the same as that of Example 2 of U. S. Patent 2,014,810 and can be sulfonated to give a dyestuff as described in that example. The yield is 90% on the anthraquinone compound as compared with 60% in U. S. Patent 2,014,810. Further, the phenoxy compound used as starting material in this example is one which can be obtained from the corresponding chloro compound in 95% yield.

*Example 2.*—100 parts of dodecyl alcohol and 6 part of sodium hydroxide powder are stirred at 150° C. for 2 hours, then cooled to 100° C. 10 parts of 1-amino-4-anilino-2-methoxyanthraquinone (made as described in Patents Nos. 1,881,-751-2) are added and the mixture stirred at 100° C. for 5 hours. The product is separated by diluting with 600 parts of ethyl alcohol and cooling to 20° C. It is filtered, washed with ethyl alcohol and water and dried at 50° C. The product is the same as that of Example 1. The yield is 76%.

The same compound may also be obtained by using instead of 1-amino-4-anilino-2-methoxyanthraquinone, the corresponding ethoxy compound (made as described in U. S. Patents 1,881,-751-2) or the corresponding gliceryloxy compound obtained by heating 1-amino-4-anilinoanthraquinone-2-sulfonic acid with glycerol and caustic soda.

*Example 3.*—3 parts of sodium are added to 100 parts of dodecyl alcohol and the mixture is heated at 120° C. for 5 hours, then cooled to 100° C. 10 parts of 1-amino-4-anilino-2-methoxyanthraquinone are added and the mixture stirred at 100° C. for 3 hours, diluted with 600 parts of ethyl alcohol, cooled to 20° C. and the product filtered off, washed first with ethyl alcohol and then with water and dried at 100° C. It is the same compound as that of Example 1 and is obtained in good yield.

Example 4.—5 parts of 1-amino-4-anilino-2-phenoxyanthraquinone, 19 parts of cetyl alcohol and 1 part of potassium hydroxide powder are stirred together at 120° C. for 6 hours. 50 parts of ethyl alcohol are added and on cooling 1-amino-4-anilino-2-cetyloxyanthraquinone separates and is filtered off, washed successively with ethyl alcohol and water and dried. The compound is obtained in good yield and is the same as that described in Example 1 of U. S. Patent 2,014,810.

Decyl or octadecyl alcohol may be used instead of cetyl alcohol and the corresponding decyloxy- and octadecyloxy-anthraquinone compounds, which are new, obtained.

*Example 5.*—20 parts of 1-amino-5-phenoxyanthraquinone (made by a similar process to that of U. S. Patent 1,038,589), 30 parts of sodium hydroxide powder and 300 parts of dodecyl alcohol are stirred at 100° C. for 5 hours. The reaction mixture is diluted with 800 parts of ethyl alcohol and 100 parts of water. On cooling and air-blowing the product separates as an orange precipitate. It is filtered off and washed successively with ethyl alcohol, ligroin and water.

The so-obtained 1-amino-5-dodecyloxyanthraquinone is a new compound, orange in colour and of M. P. 84° C. It dissolves in benzene, and acetone with an orange colour, and in concentrated sulfuric acid with a yellowish-brown colour, which changes to blue on addition of formaldehyde. If 1-hydroxy-4-phenoxyanthraquinone (made from 1-chloro-4-hydroxyanthraquinone and potassium phenate in phenol) is used instead of 1-amino-5-phenoxyanthraquinone, then 1-hydroxy-4-dodecyloxyanthraquinone, a new compound, is obtained.

Similarly by using cetyl alcohol instead of dodecyl two corresponding cetyloxy compounds namely 1-amino-5-cetyloxyanthraquinone and 1-hydroxy-4-cetyloxyanthraquinone are obtained.

*Example 6.*—19 parts of 1-phenoxyanthraquinone, 30 parts of sodium hydroxide powder and 200 parts of dodecyl alcohol are stirred at 100° C. for 5 hours. The reaction mixture is diluted with 800 parts of ethyl alcohol and 100 parts of water. On cooling and air-blowing the product 1-dodecyloxyanthraquinone separates as a yellow precipitate. It is filtered off and washed successively with ethyl alcohol and water and dried.

*Example 7.*—50 parts of dodecyl alcohol and 7.5 parts of sodium hydroxide powder are stirred at 120° C. for 1 hour, then cooled to 100° C. 5 parts of 1-methylamino-4-phenoxyanthraquinone (made by a similar process to that of U. S. Patent 1,038,589 using 1-bromo-4-methylaminoanthraquinone and sodium phenate) are added and the mixture stirred at 100° C. for 5 hours. 250 parts of ethyl alcohol are added, the product filtered cold and washed with ethyl alcohol and with water and dried. The new compound, 1-methylamino - 4 - dodecyloxyanthraquinone consists of soft red-violet crystals which melt at 92° C. and which dissolve in benzene with a reddish-violet colour and in concentrated sulfuric acid with a yellow colour which changes to blue with formaldehyde.

1-methylamino-4-cetyloxyanthraquinone is obtained in a similar manner by using cetyl alcohol instead of dodecyl, and forms red-violet crystals melting at 89° C.

*Example 8.*—When the 1-methylamino-4-phenoxyanthraquinone of Example 7 is replaced by an equal weight of 1-methylamino-4-p-cresyloxyanthraquinone, the same product is obtained.

*Example 9.*—20 parts of dodecyl alcohol and 4 parts of sodium hydroxide powder are stirred at 120° C. for 1 hour, then cooled to 100° C. 5 parts of 1-methylamino-4-phenoxyanthraquinone and 30 parts of pyridine are added and the mixture stirred at 105° C. for 6 hours. After diluting with 250 parts of ethyl alcohol and filtering from a little suspended impurity which is present the mixture is cooled to 20° C. and allowed to stand for some time. Crystals of 1-methylamino-4-dodecyloxyanthraquinone separate and are filtered off, washed with ethyl alcohol and with water and dried at 50° C.

The above description and examples are intended to be illustrative only and any modifications or variations which conform to the spirit of this invention are to be included in the scope of the claims.

We claim:

1. Process for the manufacture of alkoxy-anthraquinones in which the alkoxy substituent contains a long-chain alkyl group with 10 to 20 carbon atoms, which comprises reacting an alkali metal compound of a monohydric alcohol with 10 to 20 carbon atoms, with an anthraquinone compound which carries as a substituent a radical chosen from the group consisting of methoxy, ethoxy, propoxy, sec.-propoxy, butoxy, sec.-butoxy, tert.-butoxy, amyloxy, sec.-amyloxy, phenoxy and cresoxy.

2. Process as claimed in claim 1, which comprises obtaining the alkali metal compound of the monohydric alcohol by heating the monohydric alcohol with an alkali metal hydroxide.

3. Process as claimed in claim 1, which comprises heating a phenoxyanthraquinone with the long-chain monohydric alcohol and an alkali metal hydroxide.

4. Process for the manufacture of 1-amino-4-arylamino-2-alkoxyanthraquinones, in which the alkoxy substituent contains a long-chain alkyl group with 10 to 20 carbon atoms, which comprises reacting an alkali metal compound of a monohydric alcohol containing 10 to 20 carbon atoms with a 1-amino-4-arylaminoanthraquinone which is substituted in the 2-position by a radical chosen from the group consisting of methoxy, ethoxy, propoxy, sec.-propoxy, butoxy, sec.-butoxy, tert.-butoxy, amyloxy, sec.-amyloxy, phenoxy and cresoxy.

5. Process as claimed in claim 4 which comprises obtaining the alkali metal compound of the monohydric alcohol by heating the monohydric alcohol with an alkali metal hydroxide.

6. Process as claimed in claim 4, which comprises heating a 1-amino-4-arylamino-2-phenoxyanthraquinone with the monohydric alcohol and an alkali metal hydroxide.

7. Process as claimed in claim 4, which comprises heating a 1-amino-4-anilino-2-phenoxyanthraquinone with dodecyl alcohol and an alkali metal hydroxide.

8. Process as claimed in claim 4, which comprises heating 1-amino-4-anilino-2-phenoxyanthraquinone with cetyl alcohol and an alkali metal hydroxide.

9. α-Alkoxyanthraquinones in which the alkoxy substituent contains a long-chain alkyl group with 10 to 20 carbon atoms.

FRANK LODGE.
COLIN HENRY LUMSDEN.